United States Patent [19]

Cockram

[11] Patent Number: 4,914,356

[45] Date of Patent: Apr. 3, 1990

[54] CONTROLLER FOR GAS DISCHARGE LAMPS

[75] Inventor: David J. Cockram, Midrand, South Africa

[73] Assignee: Actronic Lighting CC, Transvaal, South Africa

[21] Appl. No.: 274,382

[22] Filed: Nov. 21, 1988

Related U.S. Application Data

[63] Continuation of Ser. No. 35,606, Apr. 7, 1987, abandoned.

[30] Foreign Application Priority Data

Apr. 8, 1986 [ZA] South Africa ............... 86/2614

[51] Int. Cl.⁴ .................................. H05B 41/38
[52] U.S. Cl. ........................... 315/307; 315/246; 315/DIG. 5; 315/DIG. 7; 315/291
[58] Field of Search ........... 315/307, 306, 261, 209 R, 315/240, 241 R, DIG. 2, DIG. 3, DIG. 4, DIG. 5, DIG. 7, 291, 246

[56] References Cited

U.S. PATENT DOCUMENTS

| | | | |
|---|---|---|---|
| 4,004,188 | 1/1977 | Cooper | 315/261 |
| 4,170,747 | 10/1979 | Holmes | 315/307 |
| 4,230,970 | 10/1980 | Potter et al. | 315/307 |
| 4,277,726 | 7/1981 | Burke | 315/307 |
| 4,322,817 | 3/1982 | Kuster | 363/26 |
| 4,327,309 | 4/1982 | Wallat | 315/362 |
| 4,337,418 | 6/1982 | Walz | 315/362 |
| 4,370,601 | 1/1983 | Horiletal | 315/307 |
| 4,412,154 | 10/1983 | Klein | 315/307 |
| 4,414,493 | 11/1983 | Henrich | 315/308 |
| 4,438,374 | 3/1984 | Karius | 315/362 |
| 4,464,606 | 8/1984 | Kane | 315/307 |
| 4,477,748 | 10/1984 | Grubbs | 315/306 |
| 4,651,060 | 3/1987 | Clark | 315/307 |
| 4,663,570 | 5/1987 | Luchaco et al. | 315/307 |

Primary Examiner—Leo H. Boudreau
Assistant Examiner—Michael Razavi
Attorney, Agent, or Firm—John P. White

[57] ABSTRACT

A controller for a gas discharge lamp supplies the lamp with a direct current which has been pulse-width modulated at a high frequency via a smoothing circuit and a polarity inversion circuit. The polarity inversion circuit periodically reverses the polarity of current supplied to the lamp to equalize electrode wear in the lamp. The controller senses the lamp voltage, current, power or other characteristics and maintains at least one operating parameter of the lamp, for example the lamp current, constant. A warm up cycle allows this parameter to be adjusted for fast starting of the lamp.

15 Claims, 4 Drawing Sheets

CONTROLLER FOR GAS DISCHARGE LAMPS

This application is a continuation of U.S. Ser. No. 035,606, now abandoned filed Apr. 7, 1987.

BACKGROUND OF THE INVENTION

This invention relates to a controller for gas discharge lamps.

Gas discharge lamps such as fluorescent lamps, low pressure sodium or mercury vapour lamps, or high intensity discharge lamps (HID lamps) are normally operated with a so-called ballast device to control the power supply to the lamp. This is because such lamps have a negative impedance characteristic, that is, their impedances drop as the lamp current increases, necessitating control of the lamp current. In addition, such lamps normally require an ignition voltage which is considerably higher than the normal operating voltage. The standard practice has been to supply the gas discharge lamp with alternating current, and to use a series reactance to limit the current to the lamp. More recent developments include the use of electronic circuits to control the alternating current waveform supplied to the lamp. Circuits are known which control the duty cycle, amplitude or frequency of the waveform.

It is also possible to operate gas discharge lamps with direct current (DC). Early DC lamp controllers, such as those for carbon arc lamps, controlled the lamp current by means of a variable series resistance. The variable resistance was, in practice, required to dissipate approximately as much power as the lamp itself. Apart from this, DC operation caused unequal wear of the lamp electrodes, thus shortening lamp life or requiring special lamp design. Present gas discharge lamps are designed with electrodes of equal size, and would thus have a shortened life span if operated with conventional DC controllers. Despite the inefficiency of earlier DC controllers, DC operation of gas discharge lamps has particular advantages in certain applications. Where such lamps are used in motion picture filming, at sport stadiums or gymnasiums, or in factories, lamp flicker from 50 or 60 Hz mains supplies can cause stroboscopic effects which are undesirable and which may even be dangerous. In particular, the range of permissible motion picture filming speeds is severely curtailed. Flicker can also be avoided by high frequency AC operation, but the use of high frequencies can cause narrowing of the electron stream in the tube of the gas discharge lamp, causing it to move around and thus creating an irregular flicker. At certain operating frequencies, resonances may occur within the gas discharge lamp which cause a visible flicker or which may even cause the lamp to shatter.

German Offenlegungsschrift 28 19 003 describes a ballast circuit for fluorescent lamps in which an inverter supplies high frequency rectified AC to the lamp via a transformer circuit. A feedback circuit derives a DC feedback voltage which is used to modulate the waveform applied to the lamp, reducing the amplitude fluctuation in the pulsing DC supply to the inverter, and thus reducing the amplitude variation in the envelope of the high frequency lamp-driving waveform.

German Offenlegungsschrift 32 11 240 discloses a lamp controller for maintaining the light output of a lamp constant over its life span. An inverter powers the lamp via an impedance transforming network and a feedback signal maintains the lamp and the network in resonance. The circuit compensates for variations in the lamp impedance.

U.S. Pat. No. 4,277,728 discloses a circuit which supplies a gas discharge lamp with a sinusoidal waveform bby means of an inverter driving a resonant network which includes the lamp load.

According to U.S. Pat. No. 4,370,601, a gas discharge lamp is supplied with a relatively low voltage alternating current waveform, with a pulse generator being connected to the lamp circuit and supplying repeated ignition pulses to maintain the lamp in a conducting state.

The circuit described in European patent publication 0 127 101 shows an inverter-based controller, which supplies alternating current to a gas discharge lamp, the frequency of the current waveform varying according to the type of lamp used. A voltage sensor at the lamp determines the type of lamp in use and adjusts the operating frequency accordingly.

British patent specification GB 2,120,870 A describes a circuit in which an HF inverter feeds a gas discharge lamp via a resonant transformer circuit to provide a near sinusoidal waveform. The lamp light output is controlled by varying the duty cycle of the waveform.

U.K. patent application GB 2,124,045 A discloses a power amplifier for driving a gas discharge lamp, the amplifier being driven by an oscillator, and a current sensor and a gain control circuit maintaining the amplifier power output constant.

SUMMARY OF THE INVENTION

According to the invention there is provided a method of operating a gas discharge lamp including the steps of:

obtaining a direct current power supply from an AC or DC mains power supply;

pulse-width modulating direct current from the direct current power supply at a high frequency in accordance with at least one predetermined lamp operating parameter;

smoothing the pulse-width modulated direct current;

applying the smoothed pulse-width modulated direct current to the lamp; and sensing at least one of the lamp operating current, the lamp operating voltage and the power dissipated by the lamp and deriving a feedback signal related thereto for maintaining the predetermined parameter constant, the lamp being ignited by the application of a high voltage ignition pulse.

The polarity of the smoothed pulse-width modulated direct current which is applied to the lamp may be periodically reversed.

Preferably, the predetermined lamp operating parameter has a different value during a warm-up phase of the lamp operation and during the normal running phase of the lamp operation.

Further according to the invention there is provided a gas discharge lamp controller comprising:

a power supply circuit adapted to provide a DC output from an AC or DC mains supply;

a switching circuit including a solid-state switching device controllable by a pulse-width modulator in accordance with at least one predetermined lamp operating parameter to provide a high-frequency pulse-width modulated DC output;

a smoothing circuit to reduce the amplitude variation of the pulse-width-modulated DC output;

means for applying the smoothed pulse-width modulated DC output to the lamp;

sensing means adapted to sense at least one of the lamp operating voltage, the lamp operating current and the power dissipated by the lamp and to provide a feedback signal related thereto to the switching circuit in order to maintain the predetermined lamp operating parameter constant; and an ignition circuit arranged to apply high-voltage starting pulses across the lamp.

The means for applying the smoothed pulse-width modulated DC output to the lamp may be adapted to periodically reverse the polarity of the output to the lamp.

Preferably the means for applying the smoothed pulse-width modulated DC output to the lamp comprises a switching device arranged to be operated by a timer circuit which measures the time that current of either polarity is supplied to the lamp and operates the switching device to equalize the net current flow through the lamp.

The controller preferably includes means for varying the predetermined lamp operating parameter between a first value during a warm-up phase of the lamp operation and a second value during the normal running phase of the lamp operation.

The switching circuit may be controlled by a microprocessor which operates according to a stored program which is adapted to the characteristics of the lamp.

BRIEF DESCRIPTION OF THE DRAWINGS

FIG. 3 is a detailed circuit diagram of a simplified version of the circuit shown in FIG. 2.

DESCRIPTION OF A PREFERRED EMBODIMENT

Figure 1:
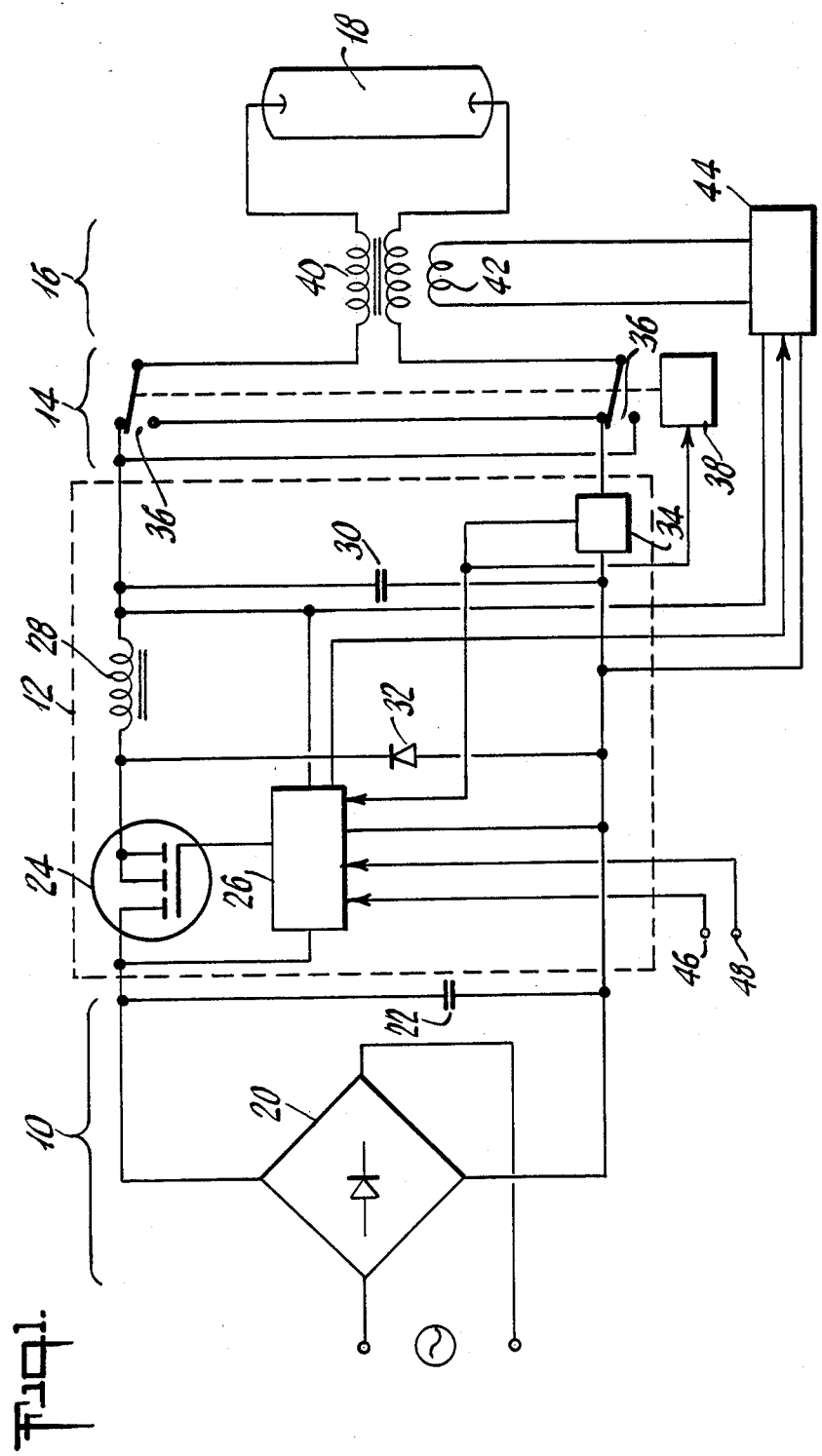
FIG. 1 is a schematic block diagram of a first embodiment of a gas discharge lamp controller according to the invention.

Referring to FIG. 1, a gas discharge lamp controller can be divided into the following basic sections: a power supply circuit 10, a power switching circuit 12, a polarity inverting circuit 14 and an ignition circuit 16. The controller drives a high intensity discharge (HID) lamp 18 of the kind suitable for use in motion picture filming, sports stadium lighting or the like.

The power supply circuit 10 comprises a rectifier bridge 20 and an RFI suppression capacitor 22 and provides an unsmoothed DC supply to the power switching circuit 12 from an AC mains supply. The power switching circuit 12 comprises a solid state switching device 24, which is controlled by a pulse width modulation (PWM) controller such as a Unitrode UC 2840 integrated PWM controller or the like. The solid state switch 24 is operated at a high frequency (for example around 60 kHz, or above the audio range) and the pulse width modulated output from the switching device 24 is smoothed by a circuit comprising a series inductor 28 and a parallel capacitor 30. A catch diode 32 transfers stored energy in the inductor 28 when the switching device 24 turns off.

A voltage feedback signal from the smoothed PWM modulated output is fed back to the PWM controller 26, and a current feedback signal is supplied to the controller 26 from a current sensing circuit 34. The output of the power switching circuit 12 is supplied to the lamp 18 via the polarity inversion circuit 14 and the ignition circuit 16. The polarity inversion circuit 14 is shown diagrammatically as comprising a pair of change-over contacts 36 which are operated by a timing circuit 38. The "contacts" may, in fact, be solid state switches. The timing circuit 38 measures the length of time that current of a particular polarity is supplied to the lamp 18 and periodically inverts the polarity of the current supply to the lamp 18 to equalize wear of the lamp electrodes. The ignition circuit 16 comprises a superimposing transformer 40 through which the lamp current passes. The transfodrmer 40 has an excitation winding 42 which is connected to an ignition control circuit 44, which provides pulses to the excitation winding 42 which are stepped up by the transformer 40 to ignite the lamp 18. The transformer 40 presents a low impedance to the lamp current, since the latter is a direct current.

Figure 2:
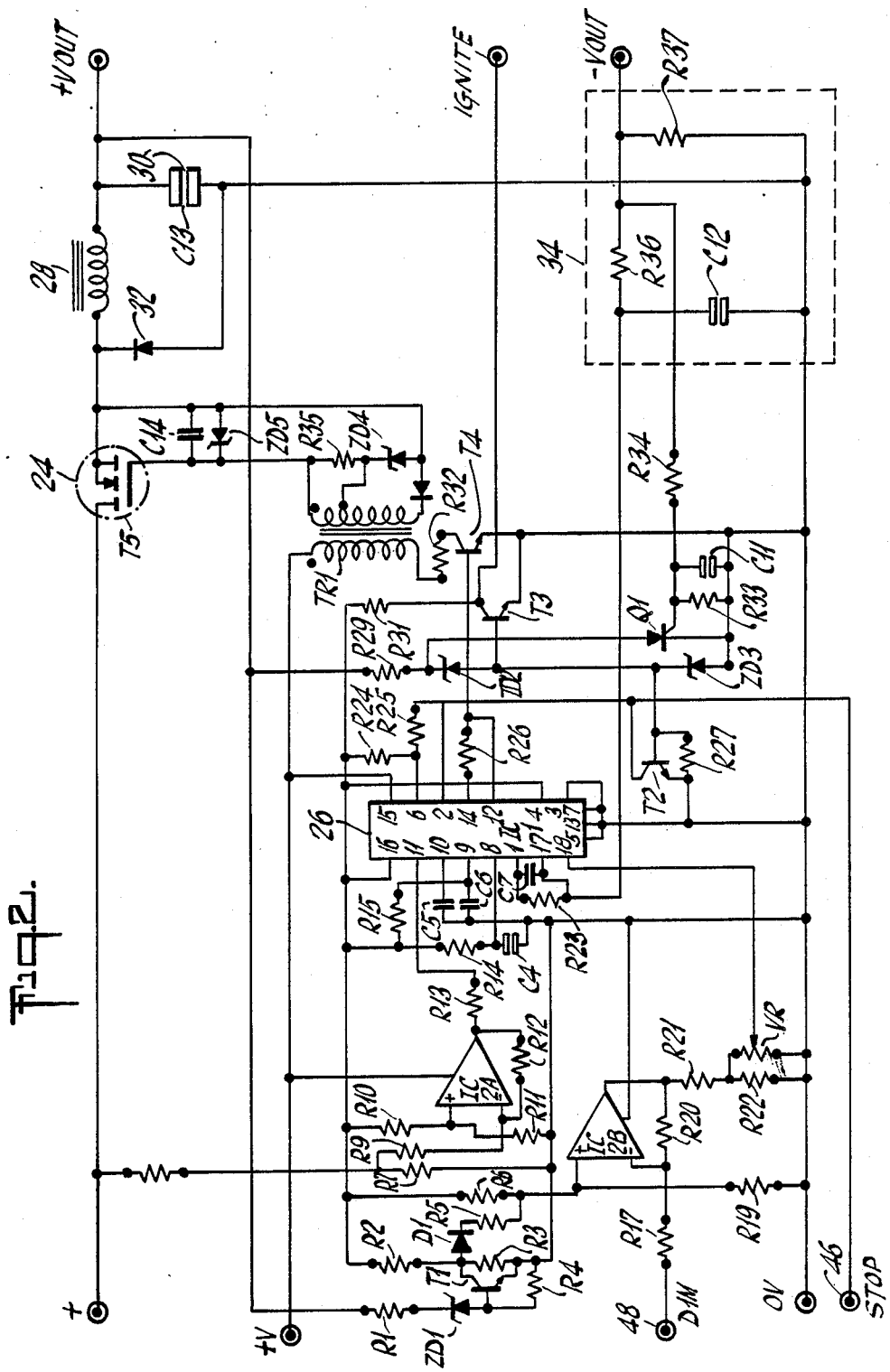
FIG. 2 is a detailed circuit diagram of a portion of the circuit shown in FIG. 1.
Figure 5:
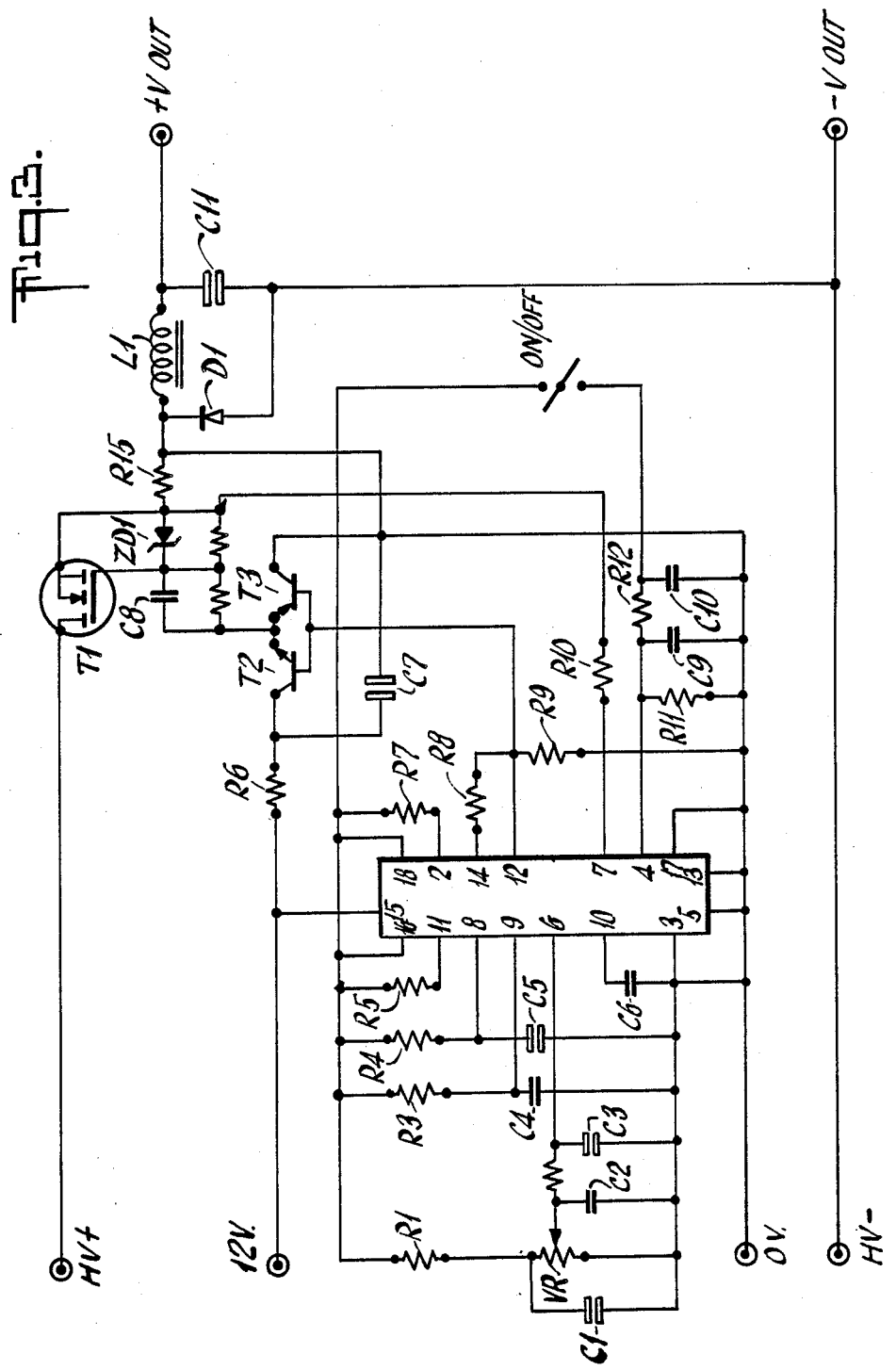

FIG. 2 shows a detailed circuit diagramm of the power switching circuit 12 of FIG. 1. The PWM controller 26 shown is a Unitrode UC 2840 which includes a PWM controller, a 5 volt voltage reference, and a ramp generator section. The power switching unit 12 also includes a dual op-amp IC 2, and a driver transformer TR 1.

The op-amp IC 2A together with resistors R2, R3, R5, R6, R17, R19 and R20 functions as a voltage adder/subtractor network, which provides an output to the PWM controller 26 which is increased or decreased according to the output voltage of the controller. The output of the op-amp IC 2A is aplied to a PWM comparator in the PWM controller 26 via two resistors R21 and R22, and a variable resistor VR which can be used to adjust the operating level of the PWM comparator. The output voltage of the lamp controller is fed back to the voltage adder/subtractor circuit via a resistor R1, a zenerdiode ZD1, a transistor T1 and a further resistor R4. When the output voltage exceeds a value set by the zenerdiode ZD1, the transistor T1 turns on, causing the voltage across the voltage divider formed by the resistors R2 and R3 to fall, thus reverse biasing the diode D1 and removing part of the reference voltage applied to the op-amp IC 2A, which decreases the voltage applied to the PWM comparator at pin 18. If the voltage at the DIM input 48 is increased, this voltage will be subtracted by the op-amp IC 2A from the voltage from the adder network, thus reducing the voltage applied to the PWM comparator and reducing the output current of the lamp controller.

The op-amp IC 2B with its associated resistors R7, R8, R9, R10, R11 and R12 forms a voltage subtractor which subtracts a voltage from the voltage divider formed by the resistors R7 and R8 from the power supply voltage. The output of the op-amp IC 2B is caused to decrease as the power supply voltage increases, cycle by cycle, at the applied mains frequency. This output is applied to the ramp control input of the PWM controller 26 via a resistor R13 to vary the ramp of the PWM controller 26. The effect of this is that as the power supply voltage of the lamp controller increases, the ramp period is increased to increase the pulse length of the pulses applied to the switching device 24. Thus, the current drawn by the controller increases with increasing applied voltage, allowing the circuit to operate at a high power factor.

A resistor R14 and a capacitor C4 form a slow-start network, which causes the output of the PWM controller 26 to increase slowly when power is first applied to the circuit. A resistor R15 and a capacitor C6 define the time constant of the oscillator circuit in the PWM controller 26, and thus define the operating frequency of the PWM controller 26. The time period of this oscillator preferably exceeds the maximum ramp period which is determined by the resistor R13 and the capacitor C5. The resistor R23 and a capacitor C7 form a feedback circuit for the error amplifier of the PWM controller 26 and together with the current measurement components R36, R37 and C12 determine the response time and accuracy of the controller. The resistor R36 and the capacitor C12 are chosen to have a time constant which is longer than the applied time of the AC waveform ie., the period of one half-cycle of the AC waveform, to allow the ramp generator to change the pulse width as required during the period of a single cycle, thus helping to provide a high power factor.

The output of the PWM controller 26 is applied via a resistor R26 and a transistor T4 to the switching transformer TR1. When the transistor T4 is turned on, a charging current for the gate of the switching transistor 24 (T5) is applied via both sections of the secondary winding of the transformer TR1 to charge a capacitor C14 in a period which is approximately equal to three times the reverse recovery period of the catch diode 32 (D4). The period depends on the characteristics of the switching device. When the transistor T4 is turned off, the charge in the capacitor C14 is dissipated in a zenerdiode ZD4 and the secondary winding of the transformer TR1, so that the turn-off time of the switching transistor 24 (T5) is less than its turn-on time. The 60 kHz pulses from the switching transistor 24 (T5) are smoothed by the inductor 28 (L1) and the smoothing capacitor 30 (C13). The characteristics of the catch diode 32 (D4) are important, since they determine the turn-on time of the switching transistor 24 (T5) and thus the maximum operating frequency of the circuit. The catch diode 32 (D4) conducts during the period when the switching transistor 24 (T5) is turned off, allowing the power stored in the inductor 28 (L1) to be transferred to the smoothing capacitor 30 (C13). The switching transistor 24 (T5) is preferably a power Mosfet. Mosfets have a higher on-resistance than comparable bipolar devices, but have lower switching losses, making them more suitable for high frequency operation.

On initial start-up of the circuit, the PWM controller 26 causes the voltage across the capacitor 30 (C13) and the lamp 18 to increase, until the zenerdiode ZD2 begins to conduct.

An overvoltage signal is then applied via a transistor T2, a resistor R29 and the zenerdiode ZD2 to pin 2 of the PWM controller 26, which stops the PWM oscillator. This limits the voltage across the capacitor 30 (C13) and the transistor T3 is turned on to provide a start-up signal to the ignition control circuit 44. Once the lamp 18 starts to draw current, which must pass through a current sensing resistor R37, the voltage developed across the resistor R37 is applied via two resistors R33 and R34 and a capacitor C11 to a thyristor Q1, which triggers to clamp the zenerdiode ZD2 together with the bases of the transistors T2 and T3 to ground, thus turning off the ignition circuit and allowing the circuit to change into its normal operating mode as determined by the voltage adder/subtractor based on the op-amp IC 2A. The ratio between the normal running current and the starting current is set by the ratio of the reference voltage $V_{ref}$ to the voltage at the voltage divider formed by the resistors R2 and R3 minus the voltage drop across the diode D1.

When the circuit is operated, the DIM input 48 is at zero volts, as is the STOP input 46, and the PWM controller 26 is turned off. When the signal at the STOP input 46 is raised to $V_{ref}$, the PWM controller 26 turns on. The output voltage of the controller rises until it reaches a level determined by the zenerdiode ZD2, at which point the PWM controller 26 is turned off to limit the voltage across the capacitor 30 (C13) and the ignition control circuit 44 is turned on, providing a high voltage starting pulse to the lamp 18. The lamp should start, but it if does not, the output voltage across the smoothing capacitor 30 (C13) and thus across the zenerdiode ZD2 will fall until the zenerdiode ZD2 ceases to conduct. The circuit will then re-cycle. When the lamp 18 starts, the zenerdiode ZD2 is clamped off and the PWM controller 26 controls the output current to the lamp 18 at a starting current of two times the nominal operating current $I_{set}$. When the output voltage of the lamp controller exceeds the level determined by a zenerdiode ZD1, a transistor T1 turns on, cancelling the starting current setting, and allowing the circuit to operate at the nominal operating current $I_{set}$. If the voltage at the DIM input 48 is increased, the op-amp IC 2A causes the voltage at pin 18 of the PWM controller 26 to drop, decreasing the output current of the lamp controller. The lamp controller is turned off by reducing the voltage at the STOP input 46 to zero.

FIG. 3 shows a simplified version of the circuit described above. The PWM controller (IC1) is the same as in the circuit of FIG. 2. However, the dual op-amp IC2 is dispensed with and starting current control is achievd by using a different amplifier circuit in the PWM controller, at pins 6 and 7. The transformer TR1 is omitted and a switching transistor T1 is directly driven by an emitter follower pair comprising two complementary transistors T2 and T3. This allows a wider control range, since the limited pulse-width handling range of the transformer is no longer a problem. The current sensing circuit 34 of FIG. 2 has also been omitted in the circuit of FIG. 3.

The ignition control circuit 44 comprises a PWM circuit which drives a transformer 40 via an excitation coil 42 to provide high voltage pulses across the lamp 18 in order to ignite it. The transformer 40 has dual secondary windings of opposite polarity in the positive and negative leads to the lamp 18 in order to halve the magnitude of the high tension (HT) to ground potential. The ignition control circuit 44 is started and stopped by signals from the PWM controller 26, and thus it can only operate when the lamp current is below a certain minimum value.

Because the lamp current is DC, the lamp control circuit does not see any appreciable impedance between itself and the lamp 18 due to the transformer 40.

The timer circuit 38 which controls the polarity inversion contacts or solid state switches 36 selects the polarity of the current supply to the lamp, and stores the period for which the lamp controller runs. On the next start-up of the lamp controller, the lamp current polarity is reversed, and the running period is deducted from the first period. On each successive start-up of the controller, the polarity of the current applied to the lamp is selected according to the net polarity imbalance in order to equalise the net current flow through the lamp over a period of time.

The described circuit controls the lamp current in two phases: a start-up phase and a normal running phase. By using a specially programmed microprocessor, the voltage and current supply to the lamp can be controlled in many steps between turn on and normal running conditions. The polarity inversion function of the timing circuit 38 can then conveniently be incorporated in the microprocessor program.

Figure 4:
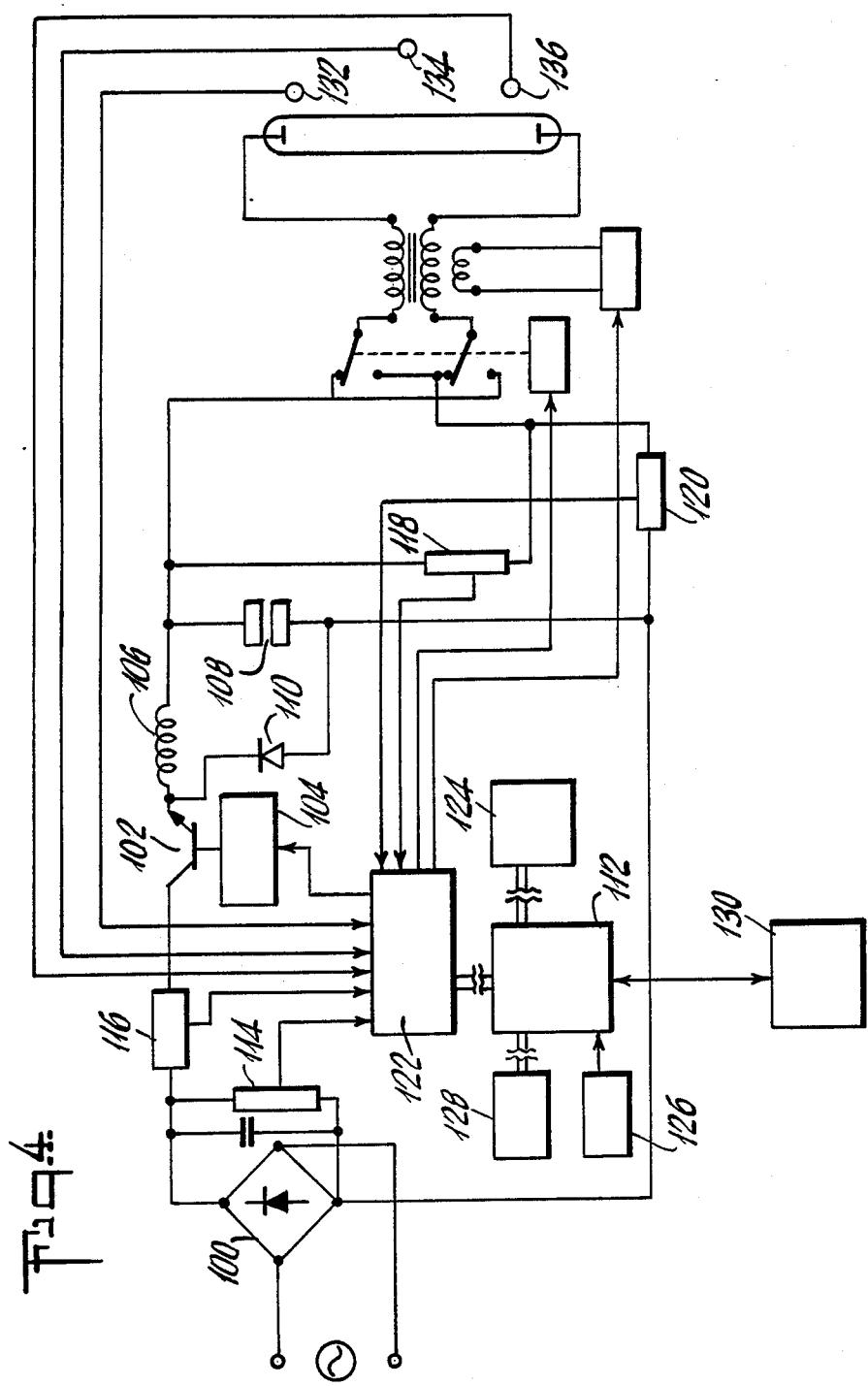
FIG. 4 is a schematic block diagram of a second embodiment of a gas discharge lamp controller according to the invention.

An alternative embodiment of the lamp controller is illustrated in FIG. 4. A rectifier 100 supplies unfiltered pulsating DC current to a switching device 102 which is controlled by a PWM driver 104. The PWM output of the switching device 102 is fed via an inductor 106, a capacitor 108 and a catchdiode 110 to a gas discharge lamp through a similar polarity inversion circuit to that shown in FIG. 1. A microprocessor 112 is provided with signals corresponding to the power supply voltage, the current drawn from the power supply, the lamp output voltage and the lamp current from sensors 114, 116, 118 and 120 respectively via an A/D and D/A conversion module 122. The microprocessor 112 has associated with it a memory 124, its own power supply 126, a switching and display module 128, and an optional remote control and display module 130. In addition to the sensors 114 to 120, further sensors 132, 134 and 136 can be provided to sense the lamp temperature, the lamp light output and the lamp colour temperature respectively.

The microprocessor 112 operates according to a program stored in the memory 124, which can include read only memory (ROM), random access memory (RAM), or a form of non-volatile memory such as an electrically erasible programmable read only memory (EEPROM). Alternatively, a RAM module with a battery back-up can be provided. The characteristics of the stored operating program can be tailored to suit the application. A simple system may measure only the lamp operating current and voltage, while a more sophisticated version may also measure the power supply voltage. A sophisticated version of the controller might measure, in addition, the lamp light output, its colour temperature, and its actual temperature. The latter version of the controller could be used, for example, in motion picture filming applications where the lamp colour temperature and other parameters are critical.

A particular advantage of microprocessor controll is found in the start-up phase of operation of the controller. On start-up of gas discharge lamps, a high lamp current is drawn at a relatively low voltage, changing to a lower current at a higher lamp voltage as running temperature is reached. The power absorbed by the lamp during start-up is ideally less than during normal operation. The stored program can be optimised for particular lamp types to provide a short warm up period without exceeding the lamp power rating, so avoiding damage to the lamp or a reduction of its life.

Measurement of the main power supply voltage allows the microprocessor 112 to regulate the PWM output to the switching device 102 to maintain the current drawn from the power supply in phase with the AC mains waveform, thus allowing maintenance of a high power factor. The display module 128 provides a readout of some or all of the measured lamp operating parameters and provide an indication of the total lamp running time, at a reasonable cost. The remote control unit 130 could be used to control a number of lamps, each lamp being identified by a unique identification code associated with its controller.

Another possible advantageous application of the microprocessor controller is in areas where lamps are operated at very low ambient temperatures. In such conditions, it is possible for the lamp to be cooled so rapidly that operating temperature is never achieved with normal controllers, or at the very least, excessive warming up times are necessary. The use of a temperature sensor in conjunction with a microprocessor allows the start-up lamp current to be increased to compensate for this phenomenon, to reduce the warming up period to an acceptable length.

Advantages of the described circuits include the fact that the lamp controller can run on AC or DC power supplies. The system can be operated on 110 or 220 volts AC/DC power supplies without adjustments. The circuit has a high effective power factor and radio frequency interference is very low. The described circuit provides the benefits associated with DC operation with the efficiency of an AC lamp controller.

I claim:

1. A method of operating a gas discharge lamp including the steps of:
   obtaining a direct current power supply from an AC or DC main power supply;
   pulse-width modulating direct current from the direct current power supply at a high frequency in accordance with at least one predetermined lamp operating parameter;
   smoothing the pulse-width modulated direct current to obtain a constant direct current with generally constant voltage and current values during steady-state lamp operating conditions;
   applying the smoothed pulse-width modulated constant direct current directly to the lamp; and
   sensing at least one of the lamp operating current, the lamp operating voltage and the power dissipated by the lamp and deriving a feedback signal related thereto for maintaining the predetermined parameter constant by varying the pulse width of the pulse-width modulated direct current, the lamp being ignited by the application of a high voltage ignition pulse.

2. A method according to claim 1 in which the number of lamp operation hours and the polarity of the smoothed pulse-width modulated direct current which is applied to the lamp are monitored and the polarity is selectively reversed at initiation of lamp operation, so as to equalize lamp operation at each polarity.

3. A method according to claim 1 in which at least one further feedback signal for maintaining the predetermined lamp operating parameter constant is derived by sensing at least one of the lamp temperature, the lamp light output, and the lamp colour temperature.

4. A method according to claim 1 in which the predetermined lamp operating parameter has a different value during a warm-up phase of the lamp operation and during the normal running phase of the lamp operation.

5. A gas discharge lamp controller comprising:
   a power supply circuit adapted to provide a DC output from an AC or DC main supply;
   a switching circuit including a solid-state switching device controllable by a pulse-width modulator in accordance with at least one predetermined lamp operating parameter to provide a high-frequency pulse-width modulated DC output;

a smoothing circuit to reduce the amplitude variation of the pulse-width modulated DC output and to obtain a constant DC output with generally constant voltage and current values during steady-state lamp operating conditions;

means for applying the smoothed pulse-width modulated constant DC output directly to the lamp;

sensing means adapted to sense at least one of the lamp operating voltage, the lamp operating current and the power dissipated by the lamp and to provide a feedback signal related thereto to the switching circuit in order to maintain the predetermined lamp operating parameter constant by varying the pulse width of the pulse-width modulated DC output; and an ignition circuit arranged to apply high-voltage starting pulses across the lamp.

6. A controller according to claim 5 in which the means for applying the smoothed pulse-width modulated DC output to the lamp is adapted to reverse selectively the polarity of the output to the lamp at initiation of lamp operation, so as to equalize lamp operation at each polarity.

7. A controller according to claim 5 in which the ignition circuit includes a transformer with at least one secondary winding in series with the current path to the lamp, an ignition control circuit, and an excitation winding adapted to be energized by a pulse from the ignition control circuit.

8. A controller according to claim 7 in which the ignition circuit includes a transformer having two secondary windings connected with opposed polarity in positive and negative leads to the lamp.

9. A controller according to claim 6 in which the means for applying the smoothed pulse-width modulated constant DC output to the lamp comprises a switching device arranged to be operated by a timer circuit which measures the time that current of either polarity is supplied to the lamp and operates the switching device at the initiation of lamp operation to equalize lamp operation at each polarity.

10. A controller according to claim 9 in which the timer circuit is arranged to select the polarity of the current supply to the lamp on start-up of the controller.

11. A controller according to claim 9 in which the switching device comprises at least one solid-state switch.

12. A controller according to claim 5 including means for varying the predetermined lamp operating parameter between a first value during a warm-up phase of the lamp operation and a second value during the normal running phase of the lamp operation.

13. A controller according to claim 12 in which the predetermined parameter is the lamp current and the first value is greater than the second value.

14. A controller according to claim 5 in which the switching circuit is controlled by a microprocessor which operates according to a stored program which is adapted to the characteristics of the lamp.

15. A controller according to claim 14 in which the microprocessor is adaptred to continually adjust the operation of the switching circuit during a warm-up phase of the lamp operation in order to control the predetermined lamp operating parameter to within a predetermined desired range of values.

* * * * *